US005183622A

United States Patent [19]

Persson

[11] Patent Number: 5,183,622

[45] Date of Patent: Feb. 2, 1993

[54] METHOD FOR FORM-PRESSING WOOD FIBRE PANELS AND FORM PRESSED PANELS, FOR EXAMPLE DOOR SKINS

[75] Inventor: Göran Persson, Jönköping, Sweden

[73] Assignee: Swedoor AB, Sweden

[21] Appl. No.: 586,497

[22] Filed: Sep. 21, 1990

[30] Foreign Application Priority Data

Sep. 29, 1989 [SE] Sweden ............................ 8903198-3

[51] Int. Cl.[5] ............................................ B29C 43/00

[52] U.S. Cl. .................................... 264/320; 264/119

[58] Field of Search ................ 264/109, 119, 319, 320

[56] References Cited

U.S. PATENT DOCUMENTS

| | | | |
|---|---|---|---|
| 2,759,837 | 8/1956 | Roberts | 264/119 |
| 3,860,381 | 1/1975 | Pesch | 425/338 |
| 3,969,459 | 7/1976 | Fremont et al. | 264/109 |
| 4,082,828 | 4/1978 | Zulli | 264/119 |
| 4,216,179 | 8/1980 | Lamberts | 264/25 |
| 4,277,428 | 7/1981 | Luck et al. | 264/118 |
| 4,410,380 | 10/1983 | Ahrweiler et al. | 156/62.2 |
| 4,415,517 | 11/1983 | Timms | 264/118 |
| 4,844,968 | 7/1989 | Persson | 428/181 |

*Primary Examiner*—Mary Lynn Theisen
*Attorney, Agent, or Firm*—Lerner, David, Littenberg, Krumholz & Mentlik

[57] ABSTRACT

Method for manufacturing form-pressed wood fibre panels, for example door skins, and panels manufactured according to the method. The process starts from a workable, mass produced panel displaying high thermal conductance, for example a so-called MDF-board or chip board. The panel is preheated to a condition where the wood fibres and the binding agent which binds the wood fibres form a pliable or stretchable composition though still in continous panel-like condition. This preheated panel is fed to a form-pressing device where the pressure is relatively slowly increased from 0 to approximately 30 kg/cm$^2$ during continuing heat supply to a temperature of around 150°-200° C. Usually this is attained in connection with door skins after a period of approximately 1,5 minutes. Finally, a form-stable, form-pressed panel is removed from the press.

7 Claims, No Drawings

METHOD FOR FORM-PRESSING WOOD FIBRE PANELS AND FORM PRESSED PANELS, FOR EXAMPLE DOOR SKINS

FIELD OF THE INVENTION

The invention relates to form-pressing wood fibre panels of board type or MDF (medium density board), and panels produced according to a special form-pressing method. The invention also enables form-pressing of mass produced thin chip boards through the particular choice of binding agent.

BACKGROUND OF THE INVENTION

For a long time there has existed the need for cheaper, outer covers of building elements such as doors, shutters, etc, and this need has increased particularly since the price of solid timber and labour costs have risen.

STATE OF THE ART

Historically a first method exists which is based on wood fibre panels or semi-finished articles according to the so-called HB-method, where the letters HB stand for hard board.

According to the method which is described for example in Danish patent No. 153 640, a heat setting binding agent is employed in an initial panel which is either of wood fibre type (board or MDF) or of wood chips (chip board). However, in order that the panel will be deep formable, the known process requires a so-called outer coating of paper on veener. Mention has also been made of using a laminate structure which is either laminated on site or is supplied in a laminated condition.

With these techniques, however, optional mechanical working on the panel afterwards cannot be carried out, at least if the coating is of paper. A veener coating allows certain slight mechanical working. Likewise, the comparatively low density, in the order of 400–600 kg/m$^3$, leads to a relatively slow thermal conductance, meaning a long press time in the form press device.

In addition, if the HB-technique is to be used, large investment for carrying out the process is required since, for example, only natural glue is used as the binding agent.

A next step in the development in this field is described in the granted U.S. patent application No. 038,232 U.S. Pat. No. 4,844,968 (Swedoor's door skin patent). Here wood particles or so-called chips are used which with the help of a resin impregnated outer coating, serving also as a carrier layer during the process, gives a high quality formable product, for example in the form of a door skin with the additional possibility to give the surface a certain structure, for example a wood grain-like finish.

Here, however, one works with the starting point in a "semi-product", i.e. chips, which means that considerable manufacturing costs are built into the manufacturing process of the door skin itself, these costs being necessarily reflected in the end product.

Thus, it would be expedient if a base material manufactured on a large scale could be used as the starting material.

OBJECTS OF THE INVENTION

The invention has the above as its object and means that whilst good mouldability is retained, a mass production factor is also introduced into the process which thus reduces the total cost.

ADVANTAGES OF THE INVENTION

Since in the process according to the invention a starting material can be used which is not only mass-producable, but which also has a higher density than chip material as given in DK 153 640, this means that a better thermal conductance is obtainable which implies a shorter form-pressing time. Since, according to the invention, a preheating step is also included, this means that this step can also be shorter than the corresponding step in connection with the technique according to DK 153 640. The invention also provides a method and a product which offer advantages of scale, workability and faster thermal conductance.

SUMMARY OF THE INVENTION

More specifically the invention provides a method for form-pressing wood fibre panels or chip board. The latter is fully possible with a suitable glue compound and chip size in a thin, finished chip board. The method is characterized in that, as a wood fibre panel, a panel containing a binding agent which displays thermal plastic properties during heating is selected, in that the panel is preheated so that the wood fibres and the binding agent which binds the wood fibres form a pliable or stretchable composition, in that this composition, whilst still in self-sustaining panel-like condition, is form pressed via application of an increasing pressure during continuous heat supply, and in that the pressure and the heat supply are interrupted before the elastic limit of the panel-like stretchable composition is attained.

The definition "binding agent which displays thermoplastic properties during heating", means that this does not relate to what is commonly known as thermoplastic binding agents in panels. What is interesting is that despite the hardening binding agent, the panel has thermoplastic properties during heating. If required, as a final step the panel can also be cooled though it is normally handleable directly after the pressing.

The term "self-sustaining" denotes the state of the wood fiber panel of the present invention after it has been heated to a predetermined temperature so that the panel is elastic yet includes a sufficient amount of binding agents to hold itself together.

In a preferred embodiment a panel with a density between 700–900 kg/m$^3$ is selected as the wood fibre panel.

For manufacturing of door skins it has been shown suitable to start with a panel which has a uniform initial thickness of 2–6 mm, whereby the process is such that the thickness, considered as product thickness, after the form-pressing is somewhat reduced, though still substantially constant.

Panels of this size are mass produced as so-called MDF-boards.

In one embodiment the form-pressing is carried out to a depth of approximately 6 mm at maximum. In the case of panel-like products, such as door skins the product is form-pressed to a depth of about 5 mm maximum.

In a preferred embodiment the total cycle time for manufacturing of door skins, including preheating, pressing and cooling, is selected to fall between about 2 and 5 minutes, preferably between 2–4 minutes.

Preheating is suitably carried out by a combined supply of contact heat and radiation.

The final temperature during form-pressing of the door skin is selected to lie between 115°-200° C. and during the form-pressing step the pressure in the form is slowly increased from 0 to 30 kg/cm$^2$.

The invention also provides a panel-like product, for example a door skin.

The product is characterized in that it is form pressed to a depth of approximately 6 mm maximum and that the product comprises a wood fibre panel with thermoplastic properties.

In a preferred embodiment the density of the panel is between 700-750 kg/m$^3$, and the quantity of the binding agent is between 5-15 percent weight.

DESCRIPTION OF PREFERRED EMBODIMENTS

A number of various trial runs under production conditions relating to verification of the grounds for the principles underlying the invention have been performed.

Accordingly, mass produced so-called MDF-boards with a thickness of 3 mm were used.

This board was preheated through radiation to a temperature of at least approximately 50° C. on the surface. Thereafter the board was loaded into a press tool comprising male and female type active zones. The male type zones were provided with a coating of "TEFLON".

During a time period of approximately 90 seconds the pressure on the preheated board was continuously increased from 0 to 30 kg/cm$^2$, meaning a relatively slow pressure increase. Simultaneously therewith the temperature was increased to an end level of approximately 150°-200° C.

Since these parameters were reached from an initial condition where the wood fibres and the binding agent after preheating, according to earlier terminology, form a pliable or stretchable self-sustaining composition, a fully form stable pressed panel with deep formed grooves and ridges of maximum approximately 6 mm depth therein is obtained after a holding time of approximately 30 seconds at final pressure.

The method, respectively the product, is accordingly built up of known components though components which are used for the first time in a completely new method and a new combination.

We claim:

1. A method for form-pressing a wood fiber panel having a substantially uniform initial thickness of between about 2 and 6 mm and a density of between about 700 and 900 kg/m$^3$, said panel containing a binding agent which displays thermoplastic properties during heating, said method comprising the steps of:

preheating said panel so that the wood fibers and the binding agent form a stretchable, self-sustaining composition;

form-pressing said pre-heated composition while still in its self-sustaining condition to a depth of up to about 6 mm by applying pressure which is slowly increased from 0 up to about 30 kg/cm$^2$ while continuining to supply heat thereto;

interrupting said pressure and heat supply before reaching the elastic limit of said self-sustaining stretchable composition; and allowing said composition to cool.

2. The method of claim 1, including form-pressing said composition to a reduced, substantially constant panel thickness.

3. The method of claim 2, wherein said preheating, form-pressing and cooling steps have a total cycle time of between about 2 and 5 minutes.

4. The method of claim 1, wherein said wood fiber panel comprises a mass produced MDF-board.

5. The method of claim 4, wherein said preheating step comprises contact heating and radiation.

6. The method of claim 5, wherein said form-pressing step includes heating to a final temperature of between about 115° and 200° C.

7. The method of claim 1, wherein said panel comprises a mass produced chip board.

* * * * *